April 22, 1924.
K. J. THOMPSON
1,491,569
RUBBER TIRE MANUFACTURE
Filed Aug. 20, 1923
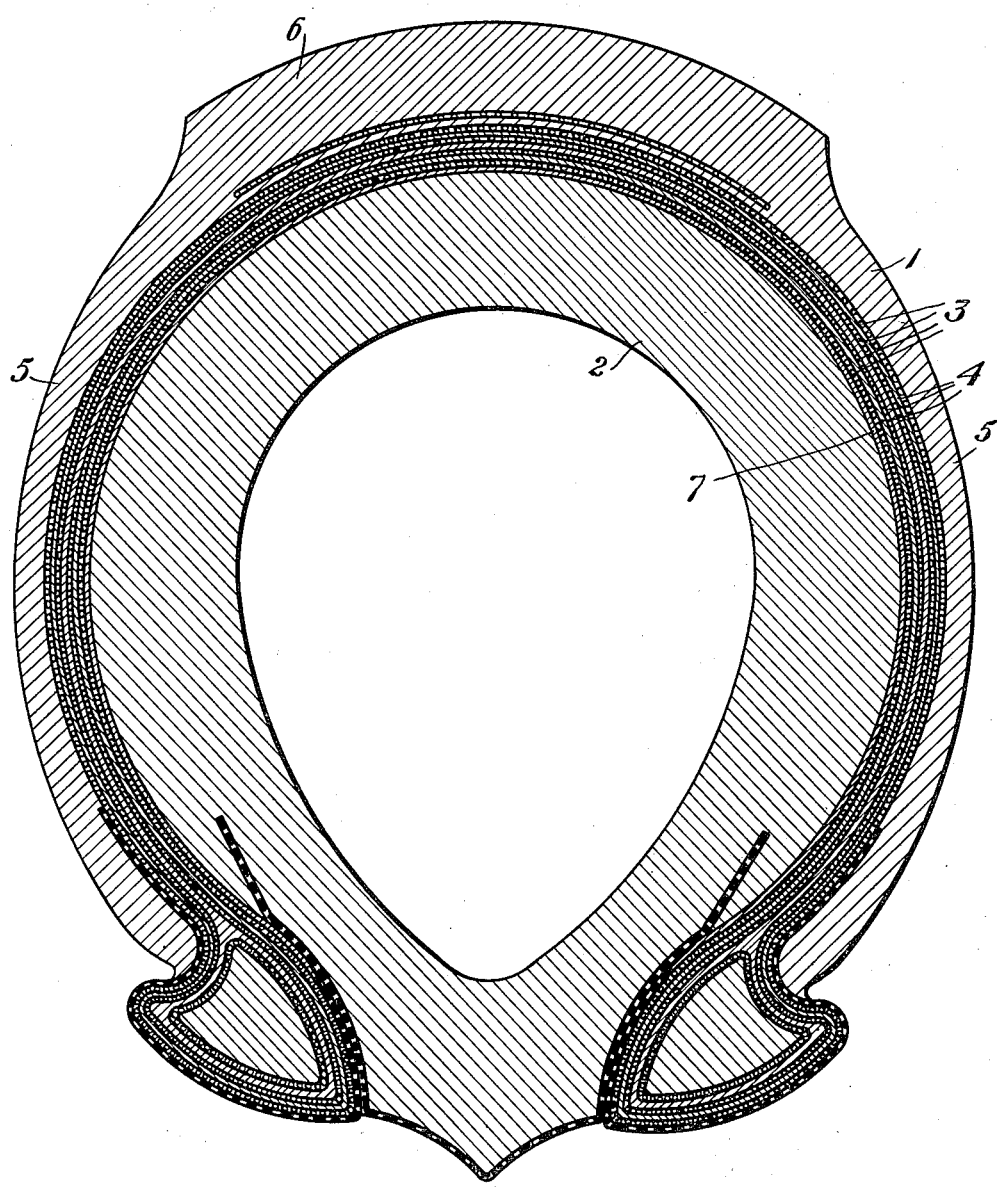
Inventor
Kenworthy J. Thompson
By Freask and Bouck
Attorneys Patented Apr. 22, 1924.

1,491,569

UNITED STATES PATENT OFFICE.

KENWORTHY J. THOMPSON, OF MANSFIELD, OHIO.

RUBBER-TIRE MANUFACTURE.

Application filed August 20, 1923. Serial No. 658,379.

*To all whom it may concern:*

Be it known that I, KENWORTHY J. THOMPSON, a subject of the King of Great Britain, residing at Mansfield, in the county of Richland and State of Ohio, have invented a certain new and useful Improvement in Rubber-Tire Manufacture, of which the following is a specification, this application being a continuation of the common subject matter contained in my pending application filed November 4, 1922, Serial No. 599,063.

The invention relates to the manufacture of pneumatic tires made of cord or square woven fabric and a rubber compound or composition containing sulfur or other vulcanizing agent, which are required to be vulcanized upon a resilient expansible core, commonly called an air bag, frequently made of vulcanized rubber compound or composition; and the object of the improvement is to prevent an over-vulcanization and consequent hardening of the outer surface of the air bag, by the migration of sulfur from the tire casing, during the process of vulcanization.

In ordinary practice, the migration of sulfur from the tire is so considerable that the outer surface of an air bag is over-vulcanized and hardened to such an extent that it becomes worthless for use after from fifteen or twenty vulcanizing cures have been made upon it, thus involving great expense in maintaining or replacing the necessary number of air bags for the manufacture of pneumatic tires by the air bag process.

This difficulty is greatly ameliorated, and the number of cures which can be made upon an air bag are multiplied many fold by the present invention, wherein a protective layer or skim coat of rubber or rubber composition or compound, made without much or any sulfur or other vulcanizing ingredient, is interposed between the tire casing and the air bag, preferably by applying it to the inner face of the tire; which protective layer receives the sulfur migrating from the tire casing, and absorbs the same in vulcanizing the protecting layer, thereby preventing any considerable portion of the sulfur from reaching the surface of the air bag.

My invention is illustrated in the accompanying drawing, wherein the figure is a cross section of a pneumatic tire casing 1 mounted upon an air bag 2; the casing being built up of a plurality of plies of fabric 3, impregnated with rubber composition, with intervening layers of rubber composition 4, upon the outer side of which are placed the side walls 5, and tread 6, and upon the inner side of which is placed a layer or skim coat 7 of rubber composition.

The rubber composition used for impregnating the fabric, and for other parts of the tire, contains a sufficient amount of sulfur or other agent for a proper vulcanization of the tire; but for the purpose of the present improvement, the inner layer or skim coat 7 of rubber is made with little or no sulfur or other vulcanizing agent in its composition, and is referred to herein as "sulfurless," to distinguish it from the rubber compound contained in the remaining portions of the tire casing, which contains enough sulfur for complete vulcanization.

The air bag 2 may be made of vulcanized rubber or rubber and fabric in well known manner; and it is evident that the presence of the sulfurless layer or skim coat of rubber on the inner side of the casing, will take up a considerable portion, if not all, of the sulfur, which migrates from the remainder of the casing during the vulcanizing process; and that the same will be arrested in and absorbed by the sulfurless skim coat, and will thereby effect a vulcanization of the same, so that very little, if any, of the sulfur will migrate to the air bag.

The sulfurless protective layer of rubber may contain hexamethylene-tetramine, or other accelerator of vulcanization, to facilitate the taking up or absorption of the migrating sulfur, thereby helping to effect a vulcanization of the protective layer as well as preventing the migration of the sulfur to the air bag.

The protective layer or skim coat of sulfurless rubber may be applied to or rolled upon the fabric which is to become the inner ply of the casing, after the same has been frictioned, or the sulfurless skim coat can be applied directly to the periphery of the metal core upon which the plies of frictioned fabric and layers of rubber composition are applied in the building of the casing. Or the inner ply of fabric may be impregnated on one or both sides with a sulfurless rubber, which ply of frictioned fabric becomes a protective layer, without the use of special layer or skim coat of sulfurless rubber. In either event the protective layer becomes the inner face and an integral part of the completed tire casing, so that each tire casing is provided with a new or fresh sulfurless coating upon its inner side to protect the air bag from migrating sulfur.

A protective layer or skim coat of sulfurless rubber compound may be applied to the outer surface of the air bag, either before or after the same is vulcanized, to assist in preventing a hardening of the surface thereof; but as this protective layer would accumulate sulfur migrating from successive tire casings cured on the air bag, the application of the protective layer to the inner face of the casing is the preferred and most effective manner of protecting the air bag.

By the improved method, individual air bags have been used for making more than one hundred and forty cures before the surface has hardened enough to prevent further use: it being understood that the usual procedure of applying to the inner surface of the tire casing or to the outer surface of the air bag, or to both, a suitable material for preventing an adhesion between the tire and the air bag before and during the vulcanization process, may be used; and that such material may include powdered soapstone or powdered mica, or a suspension of such powdered material in water, either with or without soap or glue, or in a thin rubber cement; all in accordance with usual, if not universal practice.

The broad method of interposing a sulfurless layer between the tire casing and the air bag and an air bag made with a surface layer of sulfurless material, which are described but not claimed herein, are included in the subject matter set forth and claimed in said parent application, Serial No. 599,063, of which this application is a continuation in part.

I claim:

The method of making rubber tires by the expansible core process, which consists in providing a layer of sulfurless rubber upon the inner surface of the tire casing for protecting the expansible core from hardening due to migration of sulfur from the casing.

KENWORTHY J. THOMPSON.